Oct. 17, 1933.                    Y. HUSARIK                    1,930,809
                                   PADLOCK
                              Filed Dec. 29, 1932

INVENTOR
Yustina Husarik
By Jack Snyder
   Attorney

Patented Oct. 17, 1933

1,930,809

UNITED STATES PATENT OFFICE 1,930,809

PADLOCK

Justina Husarik, Russelton, Pa.

Application December 29, 1932
Serial No. 649,274

4 Claims. (Cl. 70—108)

My invention relates to a padlock, and important objects thereof are to provide a padlock of the character described, which may be released without the use of a key, which embodies relatively few parts including an outer casing adapted to be shifted when it is desired to release the lock, which is simple in its construction and arrangement, durable and efficient in its use, compact, and comparatively inexpensive to manufacture.

With the foregoing and other objects in view which will appear as the description proceeds, the invention resides in the combination and arrangement of parts and in the details of construction hereinafter described and claimed, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1:
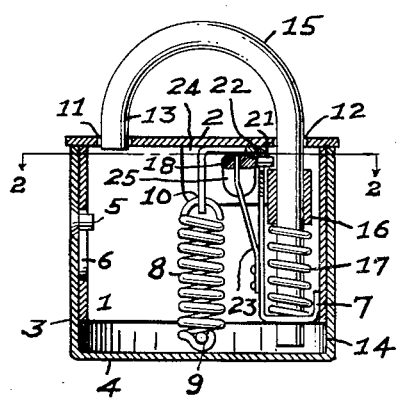
Figure 1 is a longitudinal sectional view of a padlock constructed in accordance with this invention.
Figure 3:
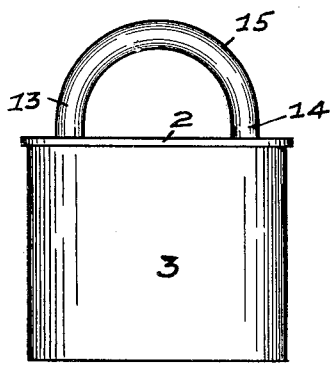
Figures 3 and 4 are, respectively, side elevational and top plan views of the device.
Figure 2:
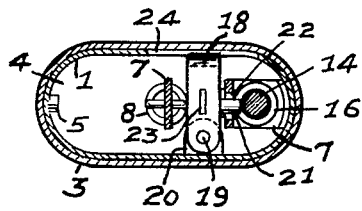
Figure 2 is a sectional view on line 2—2, Figure 1.
Figure 4:
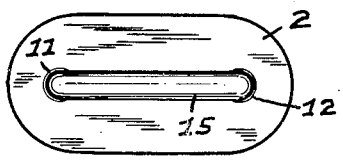

Referring in detail to the drawing 1 denotes an inner casing having an open lower end. A top plate 2 is permanently fixed to the upper end of the inner casing 1 and the edge margin thereof projects beyond the periphery of the latter.

The inner casing 1 is inclosed in an outer casing 3, which latter has an open upper end and a bottom 4. The inner and outer casings 1 and 3 are similar in contour and frictionally engage each other so that the latter may be shifted longitudinally or telescopically on the former. The movement of the outer casing 3 on the inner casing 1 is limited by a stop pin 5, which is fixed in the outer casing 3 and projects through a vertically disposed slot 6 formed in the inner casing 1. When in the closed position the upper open end of the outer casing 3 abuts against the projecting edge margin of the top plate 2, as clearly shown in Figure 1.

A substantially Z-shaped bracket 7 is mounted in the inner casing 1. The upper end of the bracket 7 is permanently secured against the inner side of the top plate 2, and the lower end thereof is fixedly joined against the inner side of the inner casing 1.

A spiral spring 8 extends vertically in the diametric centers of the casings 1 and 3, and has its lower end secured, as at 9, to the outer casing bottom 4. The upper end of the spring 8 is attached to the bracket 7, as at 10. The action of the spring 8 normally forces the outer casing 3 to the closed position on the inner casing 1, but allows said outer casing to be projected on the said inner casing a distance permitted by the stop pin 5 in the slot 6.

The top plate 2 is provided with a pair of spaced openings, respectively indicated at 11 and 12, for the passage of the arms 13 and 14 of a shackle 15. The shackle arm 14 is of materially greater length than the short arm 13, and extends through the top plate opening 12 into the inner casing 1 and through the lower end of the bracket 7. The short arm 13 is free and engages in the top plate opening 11.

A sleeve 16 is fixed to the long shackle arm 14, within the inner casing 1 and limits the vertical movement of the shackle 15, but allows the free end of the short arm 13 to clear the top plate opening 11 when the shackle 15 is released.

A spiral spring 17 is mounted on the long shackle arm 14 between the sleeve 16 and the lower end of the bracket 7. The action of the spring 17 normally forces the shackle 15 upwardly to the releasing position.

An operating bar 18 extends transversely through the inner casing 1 directly beneath the upper end of the bracket 7. One end of the operating bar 18, is pivotally connected, as at 19, to a lug 20 which latter is preferably stamped directly from the side wall of the inner casing 1. The other end of the operating bar 18 is provided with a depending lip 25 to facilitate the manipulation of said operating bar 18 when releasing the shackle 15 in the manner to be described.

The operating bar 18 carries a fixed, laterally disposed locking pin 21, which extends through an aperture 22 provided therefor in the upper end of the bracket 7. The locking pin 21 engages the upper end of the sleeve 16 and thereby secures the shackle 15 in the locked position. A flat spring 23, carried by the bracket 7 and engaging the operating bar 18, normally frees the locking pin 21 to the locking position.

The inner casing 1 is provided with a large opening 24 to provide access to the lip 25 for shifting the operating bar 18 to the releasing position.

In practice the operation of my improved padlock is as follows:—Assuming that all parts of the device are in the positions shown in Figure 1, the outer casing 3 is first pulled downwardly on the inner casing 1 to expose the opening 24 in the latter. The operating bar 18 is now shifted until the locking pin 21 clears the sleeve 16 to release the shackle 15. The latter will now be shifted outwardly by the action of the spring 17 until the sleeve 16 abuts against the top plate 2 and the free end of the short shackle arm 13 clears the associated top plate opening 11. The shackle 15 is then free to be swung laterally to effect its removal.

What I claim is:

1. In combination, a padlock comprising an inner casing, a top plate fixed to the upper end of said inner casing and provided with a pair of spaced apertures, a shackle including a pair of arms normally extending through said apertures into said inner casing, a sleeve fixed to one of said arms, a locking element mounted in said inner casing and engaging said sleeve, and an outer casing inclosing said inner casing and shiftable on the latter to permit access to said locking element.

2. In combination, a padlock comprising an inner casing, a top plate fixed to the upper end of said inner casing and provided with a pair of spaced apertures, a shackle including a pair of arms normally extending through said apertures into said inner casing, a sleeve fixed to one of said arms, a locking element mounted in said inner casing and engaging said sleeve, and an outer casing inclosing said inner casing and shiftable on the latter to permit access to said locking element, said sleeve limiting the outward movement of said shackle.

3. In combination, a padlock comprising an inner casing, a top plate fixed to the upper end of said inner casing and provided with a pair of spaced apertures, a shackle including a pair of arms normally extending through said apertures into said inner casing, a sleeve fixed to one of said arms, a locking element mounted in said inner casing and engaging said sleeve, an outer casing inclosing said inner casing and shiftable on the latter to permit access to said locking element, and means carried by said outer casing for limiting the movement of the latter on said inner casing.

4. In combination, a padlock comprising an inner casing provided with a large opening in the side wall thereof, a top plate fixed to the upper end of said inner casing and provided with a pair of spaced apertures, a substantially Z-shaped bracket mounted in said inner casing and fixed to the latter and to said top plate, a shackle including a short arm and a long arm, said arms normally extending through said apertures into said inner casing, said long arm extending through the lower end of said bracket, a sleeve fixed on said long arm for limiting the outward movement of said shackle, a spiral spring mounted on said long arm between said bracket and said sleeve for normally shifting said shackle outwardly, an operating bar pivotally connected in said inner casing, a locking pin carried by said bar and engaging said sleeve for locking said shackle, a spring carried by said bracket and engaging said bar for normally forcing said locking pin to the locking position, an outer casing inclosing said inner casing and shiftable on the latter to expose said opening to permit access to said operating bar, and a spring connected with said bracket and with said top plate for normally shifting said outer casing to inclose said inner casing.

JUSTINA HUSARIK.